United States Patent Office 3,808,174
Patented Apr. 30, 1974

3,808,174
PROCESS FOR PREPARING POLYMER GRAFT-POLYMERIZED ON CRYSTALLINE COMPOUND
Tadashi Yamaguchi, Sendai, Hiroshi Hoshi, Narashino, and Michio Hirakawa, Ichikawa, Japan, assignors to Lion Fat and Oil Company, Ltd., Tokyo, Japan
No Drawing. Filed Dec. 15, 1971, Ser. No. 208,407
Claims priority, application Japan, Dec. 29, 1970, 46/130,220
Int. Cl. C08d 1/28; C08f 3/00, 15/04, 15/08; C08g 15/00
U.S. Cl. 260—63 R          1 Claim

ABSTRACT OF THE DISCLOSURE

A polymer is grafted onto a crystalline compound by forming a crystalline compound having active centers in a free-radical polymerizable or free-radical copolymerizable monomer or a solution, emulsion, or dispersion of said monomer, whereby the active centers on the surface of the resulting crystalline compound function to initiate the polymerization reaction of the monomer.

BACKGROUND OF THE INVENTION

Field of the invention

This invention relates to a process for preparing a graft polymer onto a crystalline compound. The special type of polymer prepared in accordance with this invention is a polymer in which the monomer is graft-polymerized onto a crystalline compound. The term "graft-polymerized" is used herein to designate a unique type of binding of the crystalline compound and the polymer, which is clearly different from that of simple adsorption, or adhesion, as will be shown below.

Description of the prior art

It has been reported that organic polymers may be bonded to inorganic compounds (see Vysokomol Soedin 1, 330–331, 1713–20 (1950) by V. A. Kargin et al.). However, heretofore, no effective product or commercially acceptable process has been suggested to provide this result.

SUMMARY OF THE INVENTION

Accordingly, it is one object of this invention to provide a process for grafting a polymer onto a crystalline compound.

This and other objects of this invention has been attained by forming a crystalline compound containing active centers, in a free-radical polymerizable or free-radical copolymerizable monomer, solution, dispersion, or emulsion thereof, whereby the active centers on the surface of the resulting crystalline compound function to initiate the polymerization of said monomers to yield a graft polymer on the resulting crystalline compound.

DETAILED DESCRIPTION OF PREFERRED EMBODIMENTS

The monomers which may be used to prepare the graft polymer of this invention are any of those free-radical homopolymerizable or copolymerizable monomers having an Alfrey-Price "$e$-value" of $-0.8$ to about $+0.8$. Suitable such monomers include styrene, vinylisocyanate, 1-pentene, vinylstearate, 2-vinylpyridine, m-chlorostyrene, n-octylmethacrylate, vinylacetate, sodium acrylate, chloroprene, vinylaurate, vinylchloride, vinylidene chloride, methyl methacrylate, pentachlorostyrene, methylacrylate, methylvinyl ketone, acrylic acid, or mixtures thereof. It is also possible to use the monomers having $e$-values of $-0.8 \sim +0.8$ as stated in Journal of Polymer Science, 54, 411 (1961) by L. J. Young. These monomers may be copolymerized with one or more comonomers having $e$-values of less than $-0.8$ or higher than $+0.8$. The particular monomers and comonomers used in the process of this invention can be understood by any person skilled in the art from the above-mentioned description.

The suitable crystalline compounds having active centers used for the initiation of the polymerization reaction cannot be stated in specic nomenclature.

This crystalline compound, however, must be produced in a monomer medium or in a solution, dispersion, or emulsion containing the monomer.

The components for producing suitable crystalline compounds having active centers in said monomer containing medium are stated together with the formula of their reactions.

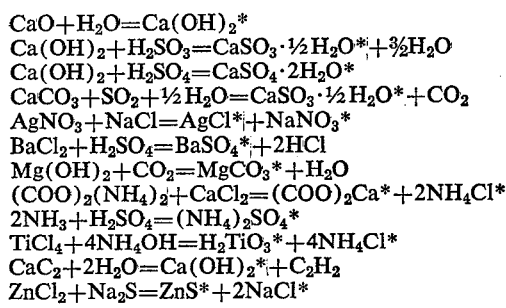

$CaO + H_2O = Ca(OH)_2*$
$Ca(OH)_2 + H_2SO_3 = CaSO_3 \cdot \tfrac{1}{2}H_2O* + \tfrac{3}{2}H_2O$
$Ca(OH)_2 + H_2SO_4 = CaSO_4 \cdot 2H_2O*$
$CaCO_3 + SO_2 + \tfrac{1}{2}H_2O = CaSO_3 \cdot \tfrac{1}{2}H_2O* + CO_2$
$AgNO_3 + NaCl = AgCl* + NaNO_3*$
$BaCl_2 + H_2SO_4 = BaSO_4* + 2HCl$
$Mg(OH)_2 + CO_2 = MgCO_3* + H_2O$
$(COO)_2(NH_4)_2 + CaCl_2 = (COO)_2Ca* + 2NH_4Cl*$
$2NH_3 + H_2SO_4 = (NH_4)_2SO_4*$
$TiCl_4 + 4NH_4OH = H_2TiO_3* + 4NH_4Cl*$
$CaC_2 + 2H_2O = Ca(OH)_2* + C_2H_2$
$ZnCl_2 + Na_2S = ZnS* + 2NaCl*$

*Note.*—The crystalline compounds produced in the process of this invention are shown by "*".

The crystalline compounds produced in the process of this invention are not limited by said examples and can be any crystalline compound which has active centers, as will be understood by any person skilled in the art from the above-mentioned description.

It is possible to select a suitable monomer, or monomers, type of solution, dispersion, or emulsion and combinations for producing the crystalline compound, depending upon the end uses for the resulting polymer.

In the process of this invention, said monomer can be used per se, or in a solution using conventional solvents as are conventionally used for solution-polymerization, such as water, benzene, alcohol, ketone, alkylhalide, ether; dispersions or emulsions prepared by using an emulsifier or surface active agent, and especially a nonionic surface active agent, in which the crystalline compound is produced and said monomer is polymerized.

The concentration of solution, dispersion, or emulsion can be determined depending upon the type of monomer, and the particular crystalline compound.

In industrial production, it is usually most effective to use water as the polymerization medium.

In the process of this invention, the reaction for producing said crystalline compound can be considered in five forms of liquid-liquid, solid-liquid, gas-liquid, gas-gas and gas-solid. However, it is most effective to use a gas-liquid reaction in industrial production, from the viewpoint of polymerization velocity adjustment, simplicity of polymerization equipment required, etc.

Even though the solubility of the resulting crystalline compound in the liquid containing the monomer is relatively high (for example, a liquid medium containing water, and the resulting crystalline compound is water-soluble), the process of this invention can be carried out by saturating the resulting crystalline compound so that the crystalline compound will be precipitated out as it is being formed.

The ratio of polymer segments formed can be varied by controlling the quantity of starting materials fed to the reaction system.

The quantity of monomer to the total weight of monomer and crystalline compound producing components is in the range of 1 wt. percent to 99 wt. percent, preferably 5 wt. percent to 99 wt. percent, especially 10 wt. percent to 99 wt. percent.

The particle size of the resulting crystalline compound is preferably in the range of $0.05\mu$ to $50\mu$, especially $0.1\mu$ to $5\mu$. The polymer segments formed will be chemically bound to the surface of the resulting crystalline compound, because of the active centers in the resulting crystalline compound.

Various additives can be included in the reaction system, so long as the activity of the active centers of the resulting crystalline compound is not inhibited and the free-radical polymerizability of the monomers are not inhibited by the addition of the additives.

If the resulting graft polymer has a high ratio of polymer segments, such as higher than 10 wt. percent, or especially higher than 50 wt. percent, it can be used as a molding material or as a sealer, such as putty. If it contains a low ratio of polymer segments, such as less than several wt. percent, it has utility as a filler material for synthetic resins, particularly thermoplastic resins. The affinity of the resulting polymer for the synthetic resin in this case, especially if the synthetic resin was made of the same monomer, is increased so that the effect of the filler in the resulting polymer is significantly increased.

The fact that the polymer is grafted onto the crystalline compound, and not just adsorbed or physically attached thereto, can be shown by Soxhlet extraction technique.

Having generally described the invention, a further understanding can be attained by reference to certain specific examples which are provided herein for purposes of illustration only and are not intended to be limiting in any manner unless otherwise specified.

EXAMPLE 1

10 g. of calcium oxide crushed to less than 100 mesh particle size was dispersed in 50 g. of methyl methacrylate monomer at room temperature at atmospheric pressure. 150 cc. of water was added thereto over a period of 2 hours to convert the calcium oxide to calcium hydroxide in the reaction system, and simultaneously to yield a graft polymer of polymethyl methacrylate and said calcium hydroxide.

In the reaction, the temperature was raised to about 30° C., mainly by heat of hydration. The resulting suspension was filtered and the residue was washed with methanol. The residue was then dried under reduced pressure by an aspirator at room temperature to yield 14.3 g. of a solid product. The resulting solid product was extracted with benzene for 24 hours by using a Soxhlet extractor, and the raffinate and extract were evaporated to dryness under reduced pressure by use of an aspirator. 14.3 g. of solid product was obtained from the raffinate, while no solid product was obtained from the extract.

Infrared spectrum analysis of a portion of the resulting solid product obtained from the raffinate showed that the solid product consisted of segments of calcium hydroxide grafted with polymethyl methacrylate. 100 mg. of solid product obtained from the raffinate was titrated with 1 N HCl at 90° C. to measure calcium hydroxide. 92 mg. of calcium hydroxide was measured.

Accordingly, the polymethylmethacrylate segment in the solid product was 8 mg., and was not extracted with benzene. This fact tends to show that the polymethyl methacrylate was graft polymerized onto the crystals of calcium hydroxide.

EXAMPLE 2

10 g. of styrene monomer were dissolved in 100 g. of methanol, and 10 g. of calcium oxide shown in Example 1 was dispersed therein. An equivalent amount of 1% of an aqueous solution of sulfurous acid was added to the dispersion over a period of 2–3 hours to neutralize the calcium oxide and to yield a graft polymer of calcium sulfite and polystyrene. The resulting product was filtered and washed with methanol. The residue was dried at 50° C. under a reduced pressure of 200 mm. Hg for 20 hours, to yield 29.1 g. of solid product.

The filtrate was evaporated to dryness under a reduced pressure by an aspirator. No solid component was obtained. 2 g. of the dried residue was extracted with benzene for 24 hours using a Soxhlet extractor. The raffinate and extract were each evaporated to dryness under reduced pressure by an aspirator. 1.97 g. of solid product was obtained from the raffinate, while no solid product was obtained from the extract.

Infrared spectrum analysis of the resulting product obtained from the raffinate showed that the solid product consisted of segments of calcium sulfite and polystyrene. The polystyrene was not extracted with benzene. This fact tends to show that the polystyrene was graft polymerized onto the crystals of calcium sulfite.

EXAMPLE 3

300 g. of calcium oxide was put into 400 cc. of water to make a dispersion of calcium hydroxide, and was cooled at about 50° C. and then 100 g. of methylmethacrylate monomer was added and further $SO_2$ gas was fed over a period of 3 hours to yield a graft polymer of calcium sulfite and polymethyl methacrylate.

The resulting product was suction filtered and then was washed with methanol to remove methyl methacrylate monomer. The residue was dried under reduced pressure by use of an aspirator, to yield 750 g. of solid product. The filtered solution was evaporated to dryness under reduced pressure by use of an aspirator, but no solid product was found. The resulting solid product was extracted with benzene for 24 hours using a Soxhlet extractor, and the extract was evaporated to dryness. Only negligible amounts of polymethylacrylate were found. 100 mg. of the raffinate was washed with 1 N NCl several times to dissolve all of the calcium sulfite to yield 7.8 g. of HCl insoluble component. Infrared spectrum analysis showed only the spectrum of polymethyl methacrylate to be found. This fact tends to show that the polymethyl methacrylate was graft polymerized onto the calcium sulfite.

EXAMPLE 4

20 g. of calcium oxide was placed into 150 ml. of water and was cooled to room temperature. 20 g. of butadiene, 30 g. of styrene, 1 g. of nonionic surface active agent were added thereto and was cooled to room temperature. An equivalent of 10% $HSO_4$ was added dropwise over a period of 4 hours to yield a graft polymer of $CaSO_4 \cdot 2H_2O$ with a copolymer of styrene and butadiene.

The resulting product was washed with water and dried at 50° C. for 24 hours under a reduced pressure of 200 mm. Hg to yield 68.2 g. of solid product.

800 mg. of the solid product dried under reduced pressure and was extracted with benzene for 24 hours by use of a Soxhlet extractor, and the raffinate was dried at 50° C. under a reduced pressure of 200 mm. Hg to yield 798 mg. of the solid product. No polymer extracted with benzene was found.

Infrared spectrum analysis showed that the solid product obtained by drying under the reduced pressure consisted of segments of $CaSO_4 \cdot 2H_2O$ and a copolymer of styrene and butadiene.

The copolymer of styrene and butadiene was not extracted with benzene. This fact tends to show that the copolymer was graft polymerized onto the $CaSO_4 \cdot 2H_2O$.

Differential thermal analyses showed that the dried solid product consisted of 87.5 wt. percent of $CaSO_4 \cdot 2H_2O$ and 12.5 wt. percent of copolymer of styrene and butadiene which was grafted thereon.

EXAMPLE 5

3000 g. of a mixture of 100 parts of methyl methacrylate monomer and 10 parts of precipitated calcium carbonate having about $1\mu$ of particle size, was fed to a reactor as shown in Example 3, and then $SO_2$ gas was fed at room temperature and under atmospheric pressure over a period of 3 hours, whereby calcium carbonate was converted to calcium sulfite and simultaneously polymethyl methacrylate was formed.

200 g. of the reaction product was dried at 40° C. for 20 hours under reduced pressure by an aspirator to yield 23.1 g. of residue. Differential thermal analysis, indicated the presence of 94.0 wt. percent of calcium sulfite and 6.0 wt. percent of grafted polymethyl methacrylate. 500 mg. of solid product was dried, and extracted with benzene for 18 hours using a Soxhlet extractor. The raffinate was dried at 40° C. under reduced pressure to yield 449 mg. of solid product. This fact tends to show that all of the polymethyl methacrylate was graft polymerized onto the calcium sulfite.

EXAMPLE 6

10 g. of calcium oxide was crushed to a particle size of less than 100 mesh and was dispersed in 100 ml. of dichloromethane (specific gravity 1.33) and then 20 g. of methyl methacrylate monomer was added thereto. After the mixture settled, 30 ml. of water was added to form a water phase and a dichloromethane phase. This was kept at room temperature for 30 hours, so that calcium oxide was hydrated by water dissolved in dichloromethane to yield calcium hydrate and simultaneously to yield polymethyl methacrylate graft polymerized onto calcium hydrate.

After removing excess water, the resulting product was suction filtered. The residue was dried at 40° C. under a reduced pressure by an aspirator to obtain 140 g. of solid product.

According to infrared spectrum analysis, the solid product consisted of calcium hydroxide having polymethyl methacrylate grafted thereon.

The filtered solution was dried at 40° C. under reduced pressure by an aspirator, whereby no solid product was obtained. The solid product from the filter residue was extracted with benzene for 18 hours using a Soxhlet extractor.

Infrared spectrum analysis showed that no polymethyl methacrylate was contained in the extract. Differential thermal analysis of the raffinate showed that it contained 94.1 wt. percent of calcium hydroxide and 5.9 wt. percent of polymethyl methacrylate which was not extracted with benzene by the Soxhlet extractor. This fact tends to show that polymethyl methacrylate was graft polymerized onto calcium hydroxide.

EXAMPLE 7

300 g. of calcium oxide was placed into 4,000 cc. of water to prepare a dispersion of calcium hydroxide, which was cooled to about 50° C., and then 100 g. of methyl methacrylate was added in the reactor described in Example 3. $CO_2$ gas was fed thereto over a period of 3 hours, to yield a graft polymer of calcium carbonate and polymethylmethacrylate. The resulting product was suction filtered, and was washed with methanol. The residue was dried under reduced pressure by an aspirator to yield 596 g. of solid product. The filtered solution was evaporated to dryness under reduced pressure by an aspirator. No solid product was found. 2.0 g. of the solid product was extracted with benzene for 24 hours using a Soxhlet extractor, and the extract was evaporated to dryness. No solid product was found, while the raffinate was 2.0 g.

Infrared spectrum analysis showed that the spectrum of calcium carbonate and polymethyl methacrylate was found. Differential thermal analysis of 100 mg. of the raffinate showed that it consisted of 89.6 wt. percent of calcium carbonate and 10.4 wt. percent of polymethyl methacrylate, which were not extracted with benzene. This fact tends to show that polymethyl methacrylate was graft polymerized onto calcium carbonate.

Having now fully described the invention, it will be apparent to one of ordinary skill in the art that many changes and modifications can be made thereto without departing from the spirit or scope of the invention.

Accordingly, what is claimed as new and desired to be secured by Letters Patent is:

1. A process for grafting a polymer onto a crystalline compound which comprises reacting at least two components for producing a crystalline compound, said two components being selected from the group consisting of $CaO + H_2O$, $Ca(OH)_2 + H_2SO_3$, $Ca(OH)_2 + H_2SO_4$, $CaCO_3 + SO_2$, $AgNO_3 + NaCl$, $BaCl_2 + H_2SO_4$, $Mg(OH)_2 + CO_2$, $(COO)_2(NH_4)_2 + CaCl_2$, $NH_3 + H_2SO_4$, $TiCl_4 + NH_4OH$, $CaC_2 + H_2O$, $ZnCl_2 + Na_2S$, $CaO + H_2SO_3$, $Ca(OH)_2 + CO_2$, whereby said two components are reacted to produce a crystalline compound having active centers, said reaction occurring in contact with a free radical polymerizable or copolymerizable monomer having an $e$-value of $$-0.8 \sim 0.8$$

and is present in a quantity of said monomer to the total of monomer and crystalline component in the range of 1–99 wt. percent, whereby the active centers on the surface of the resulting crystalline compound function to initiate the polymerization of said monomer wherein at least a substantial amount of said monomer is graft polymerized onto said crystalline compound formed by the reaction components.

References Cited

Kargin and Plate: "Polymerization and Grafting Processes on Freshly Formed Surfaces," J. Polymer Sci., 52, 155 (1961).

ALLAN LIEBERMAN, Primary Examiner

T. DEBENEDICTIS, Sr., Assistant Examiner

U.S. Cl. X.R.

260—63 N, HA, 80 M, C, 80.3 R, 80.7, 80.8, 82.1, 83.5, 83.7, 84.1, 85.7, 87.5, 87.7, 88.2, 89.5, 92.8, 93.1, 93.5, 94.3, 95